United States Patent [19]

Campanini

[11] Patent Number: 4,852,915
[45] Date of Patent: Aug. 1, 1989

[54] SHUT-OFF AND LOCKING ASSEMBLY FOR SWIVEL GLADHAND

[75] Inventor: Sergio Campanini, Iola, Kans.

[73] Assignee: Hose America, Inc., Iola, Kans.

[21] Appl. No.: 176,266

[22] Filed: Mar. 31, 1988

[51] Int. Cl.$^4$ .............................................. F16L 35/00
[52] U.S. Cl. ...................................... 285/38; 285/62; 285/79; 285/320; 285/901
[58] Field of Search .................. 285/69, 72, 76, 79, 285/23, 62, 282, 38, 901, 914, 273, 274, 320

[56] References Cited

U.S. PATENT DOCUMENTS

| | | | |
|---|---|---|---|
| 481,250 | 8/1892 | Bornes | 285/69 X |
| 558,235 | 4/1896 | Taylor et al. | |
| 682,577 | 9/1901 | Tripp | |
| 816,029 | 3/1906 | McElroy | 285/76 |
| 3,052,489 | 9/1962 | Stoudt | 265/69 |
| 3,274,827 | 10/1966 | Brown | 265/62 X |
| 3,960,365 | 6/1976 | Horowitz | |
| 4,109,673 | 8/1978 | Horowitz et al. | |
| 4,533,115 | 8/1985 | Lissau | |

FOREIGN PATENT DOCUMENTS

| | | | |
|---|---|---|---|
| 1530982 | 8/1970 | Fed. Rep. of Germany | 285/69 |
| 288028 | 4/1928 | United Kingdom | 285/79 |

OTHER PUBLICATIONS

Sloan, Brake Diaphragms and Gladhands, p. 7, parts 9201, 9202, 9235.
Sloan, "Double Bottom" Gladhands, parts 9207, 9209.
Trade America, Hose America, Inc., p. 15, Swivel Gladhand, Shutoff Gladhand.

*Primary Examiner*—Dave W. Arola
*Attorney, Agent, or Firm*—Dowell & Dowell

[57] ABSTRACT

A swivel gladhand for vehicle air brake systems which includes a continuously torsioned body portion which when not in use is automatically urged to a position wherein the outlet opening therein is seated against a stop member which seals the outlet opening therein and which also includes a selectively movable locking arm which is operable to cam the body portion against the stop member to thereby positively secure the body in sealed engagement with the stop member to prevent the loss of air pressure therethrough when the gladhand is not in use.

8 Claims, 1 Drawing Sheet

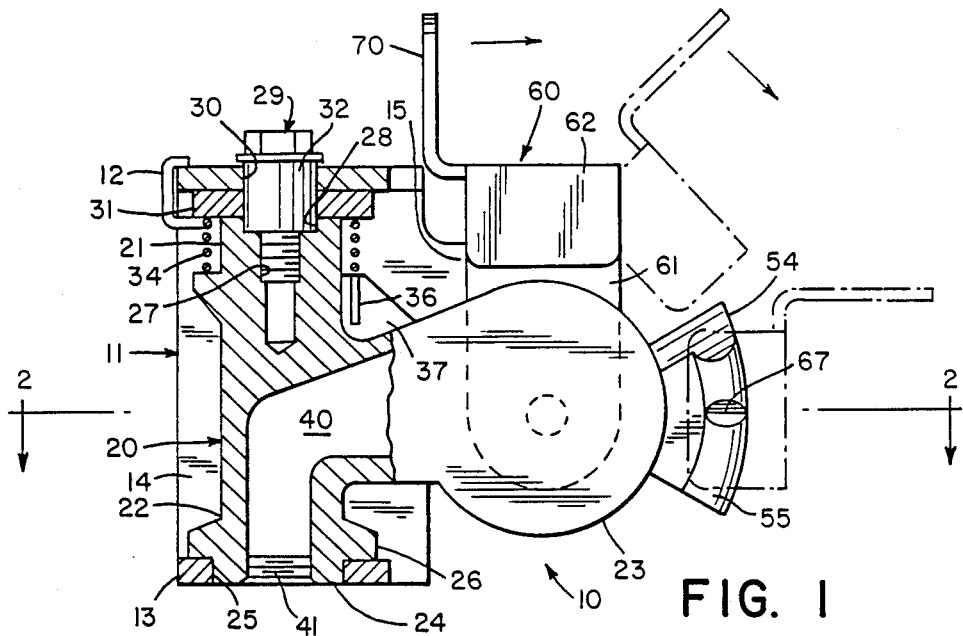
FIG. 1
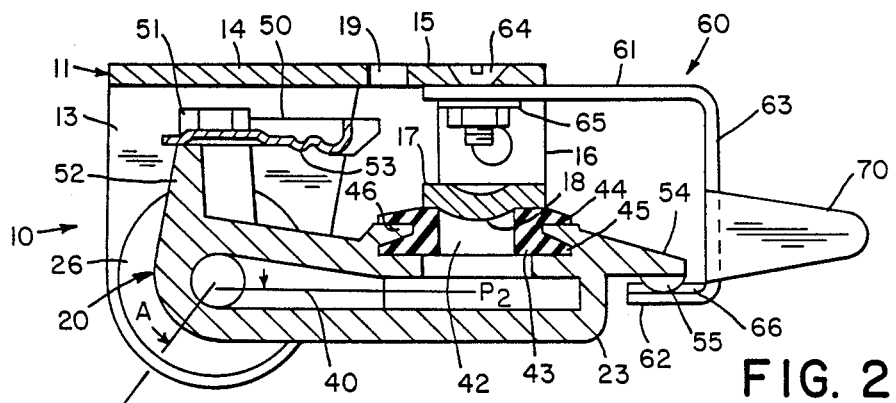
FIG. 2
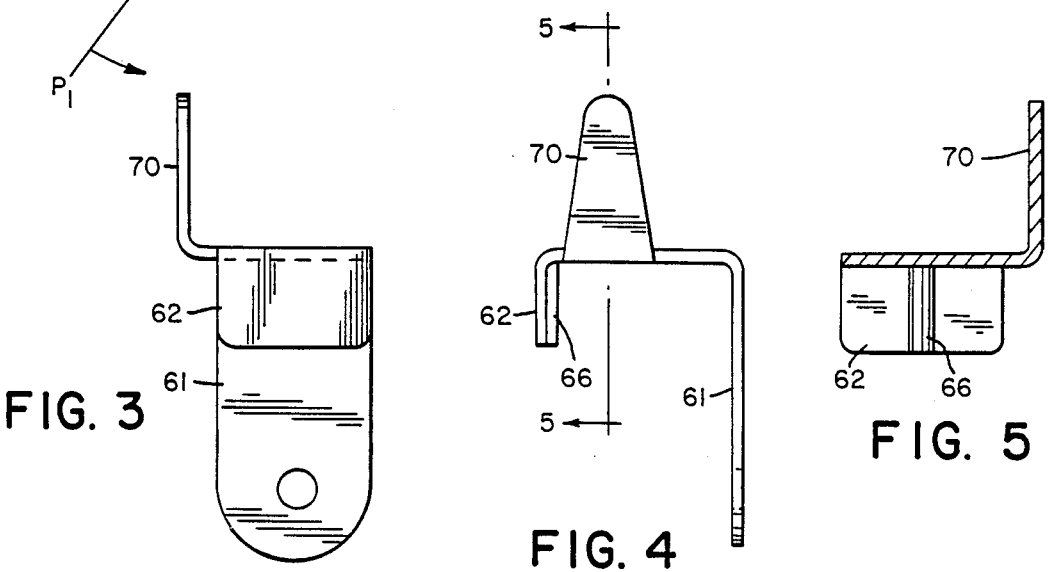
FIG. 3
FIG. 4
FIG. 5

SHUT-OFF AND LOCKING ASSEMBLY FOR SWIVEL GLADHAND

BACKGROUND OF THE INVENTION

1. Field of the Invention

This invention is generally directed to gladhands for operatively connecting the air brake lines of vehicles and especially trailers which are connected so as to be operated in tandem wherein the air brake system of the prime mover is connected through airlines associated with each trailer vehicle. The gladhands are selectively connected with one another so as to provide a leak-free connection in the brake system between the vehicles or trailers. The gladhand of the present invention is more specifically directed to a swivel type gladhand which is positively torsioned or urged into a closed position when not coupled to another gladhand and wherein the air outlet opening of the gladhand is sealed against a stop member having a seal element associated therewith when the gladhand is not in use. After the body portion of the gladhand of the present invention is moved to its non-use position wherein the opening therein is seated with respect to the seal of the stop members, a separate locking arm assembly is pivotally movable so as to urge the body portion of the gladhand into a clamped engagement with the seal thereby insuring that no air pressure will be lost through the outlet opening in the gladhand under normal vehicle operating conditions and thereby also protecting the seals of the outlet opening of the gladhand from contamination from dirt and debris.

2. History of the Related Art

In recent years, the transportation industry has found supportive legislation for enabling the use of tandemly connected trailers which are pulled by a single prime mover or tractor. The use of tandemly operated trailers makes more efficient use of the prime movers or tractors as well as conserves fuel and therefore offers an advantage over single trailer operations both in fuel economy and in the quantity of cargo which may be moved at a given time.

In order to operate the air brake systems associated not only with the prime mover or tractor vehicles but also of the trailers associated with each combination of tractors and trailers, it is necessary to provide a source of compressed air and to control the operable brake elements. A mechanical connection between air lines of the vehicles and trailers has been referred to as a gladhand assembly. The gladhand, in effect, provides a connection between each vehicle which is operated in tandem and connects the air lines in such a manner that there is no loss of air pressure at the connection therebetween. As the air systems of each of the trailers requires both a front and rear connection so that the trailers may be united in any random order, when a trailer is the last in a series of tandemly operated vehicles, it is necessary that the last or end gladhand be closed to prevent a discharge or loss of air pressure from the unused gladhand. Heretobefore, there have generally been three types of gladhand assemblies which have been utilized to close off the air line through a gladhand when the gladhand is not in use. More traditional type of shut-offs incorporate a valve member which is mounted upstream of the gladhand within the air brake system. In this type of an assembly, a separate valve member must be provided and maintenance along each vehicle air line system which not only increases the overall cost of the initial system but provides for increased maintenance costs and care which must be extended to insure the proper operation of the valves. Further, this type of an arrangement leaves the downstream gladhand exposed to atmosphere and also to road conditions when it is not coupled.

It is necessary to appreciate that gladhands are valve elements in and of themselves which elements must be in condition to be locked into sealed engagement with an associated gladhand when put to use. Therefore, the portions of the gladhands which form the locking components of a coupled gladhand assembly must be maintained free from dirt, debris, oil, grease and any other type of materials which would adversely effect the seated and sealing engagement of one gladhand with respect to another. Prior art systems that utilize an upstream type valve to close off the air line through a braking system and which do not provide some means for protecting the exposed surfaces of the unconnected gladhands have not proved to be adequate and often require increased maintenance to insure that dirt and debris is removed from the seal areas of the gladhands. In many instances, the seal components of such gladhands must be replaced after being contaminated by dirt and debris which is generated during the operation of a vehicle.

A second type of gladhand assembly incorporates a valve component as part of the gladhand itself. In these types of gladhands, a valve is provided through the body of a gladhand spaced from the interfacing surface of the gladhands. However, these types of valve assemblies, although providing for a reduced cost of initial installation, by including valve components as part of the gladhands to terminate airflow therethrough, do not solve the problem with maintaining or protecting the sealing or engaging surfaces of the gladhands when not in use which surfaces must be maintained to provide a safe and leak-free engagement between coupled gladhands.

A third type of system which is utilized to close off the air lines associated with non-used gladhands incorporate the use of "dummy" gladhands which are attached to vehicles adjacent to the conventional gladhands. In these types of systems, when the gladhands are not to be used, dummy gladhands attached by cable or chained to the vehicle are brought into place and coupled with the standard gladhands thereby sealing the interfacing surfaces between the conventional gladhands and the dummy gladhands. The dummy gladhands are different than the standard gladhands in that there are no air channels formed therethrough and therefore the connections simply terminate the air line at the point of the conventional gladhands. Unfortunately, the use of dummy type gladhands does not solve the problem associated with maintaining the interfacing surfaces of the conventional gladhands free of dirt and debris when not in use. The dummy gladhands are exposed to dirt and other elements when not used and therefore when the surfaces thereof are mated with conventional gladhands when in use, the dirt and debris built-up on the dummy gladhands contaminate the interfacing surfaces of the conventional gladhands. Further, such systems require that additional gladhand components be provided for each vehicle. This increases the overall cost and maintenancing of the entire air brake system.

Some examples of prior art patented gladhand assemblies are disclosed in U.S. Pat. Nos. 558,235 to Taylor et al.; 682,577 to Tripp; 3,960,365 to Horowitz; 4,109,673 to Horowitz et al. and 4,533,115 to Lissau.

The patent to Taylor et al. discloses a type of gladhand assembly having a valve seat formed integrally with the gladhand. In this structure, as discussed above, the member forming the valve seat will be continuously exposed to road debris, dust and dirt when the gladhand is not in use thereby possibly interfering with the proper operation of the valve assembly when the gladhand is used over a period of time. The patent to Tripp discloses a variation of an interior valve for use with a gladhand wherein the valve incorporates an elongated spring member which forces a body of the valve partially through the opening in the outlet of the gladhand. With this type of structure, the valve seat itself which surrounds the opening in the gladhand remains open to contamination by dirt, dust, road films and oils and therefore does not provide a leak-free type of connection which is necessary to insure the safe operation of the braking system.

The reference to Horowitz '365 discloses a type of gladhand assembly which also incorporates an interior valve which may be shut-off intermediate the base of a gladhand and the outlet opening therein. Although this type of gladhand assembly provides a safe shut-off for the air brake system when the gladhand is not in use, the interface portion of the gladhand remains exposed and may be contaminated as discussed above thereby requiring additional maintenance or resulting in the early failure of the seal elements associated therewith.

Horowitz et al. '673 discloses another type of combination gladhand and shut-off valve. The structure disclosed in this patent, however, was designed to overcome some of the disadvantages of the prior art and has incorporated a dust shield which is maneuverable into an overlapping relationship with the outlet in the gladhand. The system, however, requires the use of the separate valve member mounted within the gladhand assembly to effectively close off the air supply and prevent any leakage of the compressed air within the system. Such a gladhand assembly requires additional initial costs and maintenancing in that the separate valve member mounted within the assembly must be provided and maintained in order to insure an effective seal through the gladhand.

The prior art patent to Lissau discloses a further attempt to prevent the contamination of a gladhand interface valve by providing a plug member which is insertable through the opening in the gladhand to prevent the buildup of dirt in the area of the seal. In this reference, a reciprocating piston blocks the opening when the gladhand is in a non-use position. As with prior structures, however, this type of system requires that a valve member be provided within the gladhand assembly which valve member is slideably disposed relative to the opening in the seal. The operation of the valve member requires gaskets to be provided with respect to the valve body and the internal bore through the gladhand. These additional components not only add to the additional cost of the gladhand but also require separate maintenancing to insure the proper operation of the gladhand.

In an effort to overcome the problems and inefficiencies of conventional gladhands, the applicant of the present invention developed a swiveled and self-closing gladhand assembly. This gladhand assembly utilized a spring element to urge the body of the gladhand into a position, when not in use, wherein the outlet opening in the coupling member is urged into engagement with an exterior seal. Unfortunately, although this type of gladhand protects the sealing surfaces of the gladhand when not in use and also avoids the use of a separate valve member either combined with or remote from the gladhand, the closure is subject to air leakage at high operating pressures.

SUMMARY OF THE INVENTION

This invention is directed to a gladhand assembly including a mounting bracket to which a base portion is movably mounted so as to be partially rotatable about an axis which is in common with the outlet from the air line associated with the braking system of a vehicle and wherein the body portion of the gladhand is automatically moved from a first position in which the gladhand may be connected with an adjacent gladhand to a second closed position wherein the outlet opening in the coupler portion of the body of the gladhand assembly is brought into sealed engagement with a stop element carried by the bracket assembly. The gladhand assembly further includes a locking arm which is pivotally connected to the mounting bracket and is brought into clamping engagement with respect to the coupler portion of the body of the gladhand when the gladhand is moved to its closed or second position and which assures that the gladhand is retained in sealed engagement with the seal element carried by the stop member so that no compressed air will leak through the gladhand under normal brake operating pressures.

In the preferred embodiment, a torsion spring is provided to constantly urge the body portion of the gladhand toward the second position and which torsion spring is mounted between the body of the gladhand and the mounting bracket. To facilitate the locking of the locking arm with the coupler portion of the gladhand, and to insure that the locking arm is not accidentally disengaged from the coupler portion of the gladhand, an extension or protrusion is provided along a flanged element of the locking arm which protrusion is seated within a groove formed in the flange element of the coupler portion of the body.

In addition to the foregoing, a handle is provided on the locking arm and extends outwardly with respect to the coupler portion of the gladhand body so that the locking arm is easily manipulated to both move the locking arm into and out of engagement with respect thereto.

It is a primary object of the present invention to provide a gladhand assembly for use in vehicles and trailers which are operated in tandem which will provide an effective coupling arrangement for the braking systems of such vehicles wherein when the gladhand assembly is not in use, the body portion thereof will be automatically moved to a closed position relative to a seal which seats with respect to the outlet opening in the gladhand and wherein the seal and the opening in the gladhand are positively maintained in a closed position relative to one another by a locking arm assembly which is selectively brought into clamping relationship with respect to the coupler portion of the gladhand after the gladhand has been moved to its closed or second position.

It is another object of the present invention to provide a gladhand assembly wherein the interface components of the gladhand associated with the opening therein are protected against contamination from dirt, dust and other debris or films by providing a positively urged clamping engagement between the coupling portion of the gladhand and a fixed stop member carried by a bracket associated with the gladhand assembly and wherein the engagement is positively locked by a separate locking arm assembly which secures the two components relative to one another.

It is also an object of the present invention to provide a gladhand assembly which may be constructed and maintained more easily and economically than prior art gladhand assemblies and one in which no separate valve member is required to be mounted within or upstream of the gladhand and wherein the closure or seal for the outlet of the gladhand coupler not only functions to provide a closing valve for the air line system but does so in such a manner as to protect the interfacing portions of the coupler portion of the gladhand from contamination.

It is yet another purpose of the present invention to provide a gladhand assembly wherein the operative components of the system which form the closure valve for the gladhand, when not in use, are components which are mounted exteriorly of the air passageway through the gladhand so that the replacement of parts and seals may be easily accomplished without dismantling the entire gladhand to thereby facilitate the ease of maintenance and reduce the amount of downtime necessary to properly maintenance the gladhand assembly to insure proper safe operation in vehicle braking systems.

It is also an object of the present invention to provide a gladhand assembly for vehicle braking systems wherein the body portion of the gladhand is swivelly mounted with respect to a mounting bracket assembly so that the coupler portion thereof is freely movable so as to compensate for the change in angled relationship between the coupling elements of a pair of assembled gladhands when the gladhands are in use and wherein the gladhands are automatically returned to a closed and position in which the openings into the coupling components are protected when the gladhands are not in use and which are sealed by a locking bracket carried by the gladhand assembly.

BRIEF DESCRIPTION OF THE DRAWINGS

FIG. 1 is a front elevational view of the gladhand of the present invention showing the locking arm assembly being moved from a rest position to a clamped position relative to the coupler portion of the coupler portion of the gladhand when the coupler portion is moved to its closed, sealed and non-use position.

FIG. 2 is a cross sectional view taken along lines 2—2 of FIG. 1.

FIG. 3 a side elevational view of the locking arm of the present invention.

FIG. 4 is an elevational view taken from the right side of FIG. 3 showing the handle portion of the locking arm of the present invention.

FIG. 5 is a cross sectional view taken along lines 5—5 of FIG. 4.

DESCRIPTION OF THE PREFERRED EMBODIMENT

With continued reference to the drawings, the gladhand assembly 10 of the present invention includes a bracket 11 which is generally U-shaped in configuration. The bracket includes upper and lower generally parallel extensions or leg members 12 and 13 which are joined by a mounting plate 14. The mounting plate includes an outer portion 15 that extends generally perpendicularly with respect to the extension members 12 and 13. A stop member 16 is carried by the outer portion 15 so as to extend perpendicularly thereto and in a direction similar to that of the extension members 2 and 13 and in a plane which is intermediate the plane defined by the extension members. The stop member includes an outer flange 17 which includes a raised seal 18 for purposes which will be discussed in greater detail hereinafter. The mounting plate includes openings 19 through which conventional fasteners may be extended in order to secure the bracket 11 to a motor vehicle or trailer (not shown). The bracket will be mounted so as to be proximate to the break air line associated with a given vehicle or trailer so that an appropriate connection may be made between the air lines and the gladhand assembly.

Mounted between the extension members 12 and 13 of the bracket 11 is the body portion 20 of the gladhand assembly 10. The body includes a base portion having first and second ends 21 and 22 and an outwardly extending interfacing or coupling portion 23. The body 20 is pivotally or swivelly mounted to the bracket 11 so as to accommodate for the relative movement between connected gladhands of tandemly operated vehicles or trailers. To this end, the first or lower end 22 of the body 20 of the gladhand includes an annular sleeve 24 which is seated within an opening 25 in extension member 13. An annular flange 26 is provided adjacent the sleeve 23 and serves as a stop and bearing surface for the body 20 relative to the bracket of the gladhand assembly. The body is preferably pivotable through an angle A of approximately 135°.

The upper or second end 21 of the base of the gladhand body includes a threaded bore 27 having a counterbore 28. A fastener 29 is disposed through an opening 30 in the extension member 12 and is cooperatively receivable within the bore 27. An annular spacer element 31 is provided between the extension member and the upper end portion of the body and serves to prevent the body of the gladhand from binding with the extension members of the bracket as the fastener 29 is threadingly engaged within bore 27. A bearing sleeve 32 is also provided which surrounds the fastener and extends through the opening in the spacer element and opening 30 in the extension member. The sleeve 32 is seated within the counterbore 28.

The gladhand of the invention is not only designed to permit the body 20 to rotate relative to the bracket but also is resiliently urged from a first position P1 wherein the coupler or interfacing member 23 extends outwardly from the mounting plate 14 of the bracket to a second position P2 wherein the coupler member engages the flange element 17 of the stop member at which position the coupler member is generally parallel with the mounting plate. A torsion spring 34 having upper and lower ends 35 and 36 is positioned about the upper end of the base portion of the body. The upper end of the spring element engages the upper extension member 12 while the lower end thereof engages a flange 37 formed between the base and coupler member portions of the body of the gladhand assembly. The torsion spring provides a constant force against the flange 37 thereby urging the body of the gladhand to its second or closed position as shown in FIGS. 1 and 2 of the drawings.

As previously discussed, the gladhand assembly enables a coupling to be achieved between the air line systems of tandemly operated vehicles or trailers. Therefore, an air line passageway 40 extends through the body portion of the gladhand assembly. The passageway or channel 40 extends from a threaded opening 41 in the lower end portion 22 of the body and extends upwardly and outwardly through the body terminating in an outlet opening 42 in the coupling or interfacing portion 23 thereof. The opening 42 is provided with an annular and resilient seal 43 which includes a pair of spaced annular flanges 44 and 45 which engage the walls 46 which define the opening 42 in the coupler portion of the body. The seal element 43 is designed to be replaced when necessary.

In order to effect a coupling between opposing gladhand assemblies, the body portion 20 of each gladhand assembly also includes a clamp 50 which is secured by a pair of spaced bolts 51 within bores provided in a raised segment 52 of the base portion of body 20. As shown in FIG. 2 of the drawings, the clamp 50 extends generally parallel and outwardly toward the seal element 43. The clamp is further provided with a series of ribs generally shown at 53 which are engageable with an outwardly extending flange 54 carried by the coupler end of the body of the gladhand assembly. In this manner, when opposing gladhands are connected to one another, they will be connected with their seal elements 43 in abutting contact and with the openings 42 therein aligned. The flange 54 of each gladhand will be engaged by the clamp 50 of the opposing gladhand assembly. To aid in this connection, the outer flange elements 54 are provided with a raised arcuate rib generally shown at 55 which is seated between the ribs 53 of the opposing clamp.

When a gladhand of the present invention is not in use, the torsion spring 34 will automatically cause the body portion of the assembly to be moved to the closed position P2 shown in FIG. 2 of the drawings. In this position, the opening 42 into the coupler member of the gladhand assembly will be abutted with the flange element 17 of the stop member 16. Further, the raised seal 18 carried by the stop member will provide a close fit between the stop member and the seal element 43. Because of this engagement, the seal element 43 and air passageway 40 are protected from contamination from dirt, debris, road films and the like. In addition, airflow through the passageway 40 is terminated at opening 42 by the engagement of the flange element 17 with the seal element 43. However, under some operating conditions, it is possible that a leak may occur at the point of the interface between the flange element 17 and the seal 43.

A fail-safe and leak proof non-use engagement of the components of the gladhand assemblies of the present invention is achieved by providing a separate locking assembly 60. The locking assembly 60 includes a generally U-shaped bracket having upper and lower generally parallel flange elements 61 and 62 which are joined by an intermediate portion 63. The upper flange element 61 is pivotably mounted to the mounting plate 14 of the bracket by a fastener 64 which is provided with an appropriate washer 65. As shown in FIG. 2 of the drawings, the upper flange 61 of the locking assembly extends outwardly beyond the flange element 54 of the body of the gladhand assembly. The lower flange 62 of the locking assembly 60 extends inwardly toward the body of the gladhand assembly and is oriented immediately adjacent to or proximate to the underside of the flange element 54.

To accomplish a secure clamping engagement between the lock assembly and the flange 54 of the body portion of the gladhand assembly, the distance between the flanges 61 and 62 should be such as to insure that the flange element 54 is positively urged toward the mounting plate 14 when the flange 62 is in engagement therewith. The seal element 43 associated with the opening 42 in the coupler member of the body is thereby forced into engagement with the flange element 17 of the stop member 16. To further assist in the locking engagement between these components, a protrusion 66 is provided centrally of the flange 62 and extends upwardly toward the flange 54 of the coupler member. The arcuate rib 55 is provided with a central slot 67 in which the protrusion 66 is seated when the locking assembly is in engagement with the coupler member so as to retain the locking assembly in fixed relationship with respect to the flange 54. In this manner, the locking assembly may not be displaced or dislodged without applying significant force to rotate the locking assembly relative to the flange 54. The protrusion 65 also serves as a cam surface to further increase the clamping force exerted upon the body portion of the gladhand assembly.

To facilitate the engagement and disengagement of the locking assembly 60 with the body portion of the gladhand assembly, a handle 70 is integrally formed with the intermediate portion 63 of the locking assembly and extends outwardly thereof. The handle 70 may be manipulated by a vehicle operator to both urge the locking assembly into clamping engagement with the body portion of the gladhand and likewise to disengage the components when the body of the gladhand assembly is to be connected to an opposing gladhand body.

As shown in FIG. 1 of the drawings, the locking assembly 60 is pivoted from a non-use position shown in full line to the locked position shown in dotted line. The locking position is shown in full line in FIG. 2. With the locking assembly in place, the gladhand assembly of the present invention not only provides protection for the seal element 43 by preventing the seal from being effected by dirt, dust, road films, oils and the like, but the locking assembly also serves to positively close the opening 42 and thereby forms a closure for the air passageway and the vehicle brake lines which is more economical than the cut-off valves utilized with conventional gladhand assemblies.

I claim:

1. A combination swivel gladhand and locking assembly comprising a gladhand including a mounting bracket and a body having a base portion pivotally mounted to said mounting bracket so as to be movable from a first to a second position, said body having a coupler member extending outwardly from said base portion, a stop member carried by said mounting bracket, a seal member carried by said stop member, a first opening in said base portion and a second opening in said coupler member, an air passageway extending through said base portion and said coupler member and communicating said first and second openings with one another, said coupler member being spaced from said stop member when said base portion is in said first position and said second opening in said coupler member being closed by said seal member when said base portion is in said second position, a looking bracket having a first portion pivotably mounted to said mounting bracket and a second portion extending outwardly therefrom, said locking member being pivotable between a first and second position, said second portion of said locking bracket being selectively engageable with said coupler member when said coupler member is closed by said seal member and said locking member is pivoted to said second position to thereby retain said coupler member against said seal member.

2. The combination swivel gladhand and locking assembly of claim 1 in which said locking bracket is a generally U-shaped member in which said first and second portions are joined by an intermediate section, said coupler member including an outwardly extending flange, said second portion of said locking bracket being selectively engageable with said flange of said coupler member when said base portion of said body is in said second position.

3. The combination swivel gladhand and locking assembly of claim 2 in which said flange of said coupler member includes a recess, said second portion of said locking bracket including a cam means which is selectively seated within said recess to thereby prevent the accidental displacement of said locking bracket relative to said coupler member.

4. The combination swivel gladhand and locking assembly of claim 2 in which said locking bracket includes a handle means extending outwardly of said intermediate section thereof so as to extend outwardly of said flange when said locking bracket is in engagement therewith.

5. The combination swivel gladhand and locking assembly of claim 2 including resilient means for continuously urging said body toward said second position.

6. The combination swivel gladhand and locking assembly of claim 5 in which said resilient means includes a torsion spring having first and second end portions, said first portion engaging said mounting bracket and said second portion engaging said base portion of said body.

7. The combination swivel gladhand and locking assembly of claim 6 in which said base portion of said body includes first and second ends, said torsion spring being mounted about said first end and said first opening extending through said second end so as to be in axial alignment with said torsion spring.

8. The combination swivel gladhand and locking assembly of claim 7 in which said coupler member includes a generally annularly shaped elastomeric seat member which is removably seated within said second opening.

* * * * *